(12) United States Patent
Niem et al.

(10) Patent No.: US 8,285,044 B2
(45) Date of Patent: Oct. 9, 2012

(54) IMAGE-PROCESSING DEVICE, SURVEILLANCE SYSTEM, METHOD FOR ESTABLISHING A SCENE REFERENCE IMAGE, AND COMPUTER PROGRAM

(75) Inventors: Wolfgang Niem, Hildesheim (DE); Stefan Mueller-Scheiders, Düsseldorf (DE); Marcel Merkel, Hildesheim (DE)

(73) Assignee: Robert Bosch GmbH, Stuttgart (DE)

( * ) Notice: Subject to any disclaimer, the term of this patent is extended or adjusted under 35 U.S.C. 154(b) by 837 days.

(21) Appl. No.: 11/779,433

(22) Filed: Jul. 18, 2007

(65) Prior Publication Data

US 2008/0019566 A1    Jan. 24, 2008

(30) Foreign Application Priority Data

Jul. 21, 2006  (DE) .......................... 10 2006 033 936
May 29, 2007  (DE) .......................... 10 2007 024 868

(51) Int. Cl.
*G06K 9/34*    (2006.01)
*G06K 9/00*    (2006.01)

(52) U.S. Cl. ........................ 382/173; 382/103
(58) Field of Classification Search .................. 382/173, 382/103
See application file for complete search history.

(56) References Cited

U.S. PATENT DOCUMENTS

| | | | |
|---|---|---|---|
| 5,301,239 A * | 4/1994 | Toyama et al. | 382/104 |
| 5,912,980 A * | 6/1999 | Hunke | 382/103 |
| 6,061,088 A * | 5/2000 | Khosravi et al. | 348/169 |
| 2001/0022862 A1* | 9/2001 | Alm | 382/305 |
| 2002/0196962 A1* | 12/2002 | Fukuhara et al. | 382/103 |
| 2003/0058237 A1 | 3/2003 | Lee | |
| 2004/0105573 A1* | 6/2004 | Neumann et al. | 382/103 |
| 2004/0151342 A1 | 8/2004 | Venetianer et al. | |
| 2004/0252194 A1* | 12/2004 | Lin | 348/169 |
| 2005/0041579 A1 | 2/2005 | Medina et al. | |
| 2005/0078853 A1 | 4/2005 | Buehler et al. | |
| 2007/0052807 A1 | 3/2007 | Zhou et al. | |

OTHER PUBLICATIONS

Kentaro Toyama et al: "Wallflower: Principles and Practice of . . . ", ICCV 1999, Corfu, Greece.

* cited by examiner

*Primary Examiner* — Bernard Krasnic
(74) *Attorney, Agent, or Firm* — Michael J. Striker

(57) ABSTRACT

An image-processing device carries out an object segmentation in which the object segmentation is executed and/or is executable through comparison of a camera image to a scene reference image of a surveillance scene, equipped with a learning device for generating the scene reference image; the learning device generates the scene reference image through evaluation of a medium-term and/or long-term observation of the surveillance scene a) that extends over a time period of longer than one day, preferably longer than several days, in particular longer than 1 week, and/or b) that extends over a time period that includes several states of the surveillance scene.

14 Claims, 2 Drawing Sheets

IMAGE-PROCESSING DEVICE, SURVEILLANCE SYSTEM, METHOD FOR ESTABLISHING A SCENE REFERENCE IMAGE, AND COMPUTER PROGRAM

CROSS-REFERENCE TO A RELATED APPLICATION

The invention described and claimed hereinbelow is also described in German Patent Application DE 102006033936.3 filed on Jul. 21, 2006 and DE 10 2007 024868.9 filed on May 29, 2007. These German Patent Applications, whose subject matter is incorporated here by reference, provide the basis for a claim of priority of invention under 35 U.S.C. 119(a)-(d).

BACKGROUND OF THE INVENTION

The invention relates to an image-processing device for executing an object segmentation in which the object segmentation can be and/or is carried out by comparing a camera image to a scene reference image of a surveillance scene, equipped with a learning device for generating the scene reference image; a surveillance system that includes the image-processing device and a plurality of interfaces for connection to surveillance cameras; a method for establishing a scene reference image of a surveillance scene; and a corresponding computer program.

Video surveillance systems are used in a multitude of applications in order to monitor large areas. Such video surveillance systems customarily include a plurality of fixed-mounted cameras that record relevant surveillance scenes and a central surveillance station in which the video sequences of the cameras are brought together. Often, the evaluation of the assembled video data is performed by surveillance personnel. As is known, the surveillance activities of surveillance personnel are very fatiguing, which is why the possibility that important events in the surveillance scenes may be overlooked cannot be ruled out. For this reason, it has long been common practice to use known image-processing algorithms for automated evaluation of video sequences.

One method step often used in the automated evaluation is object segmentation in which moving objects in the video sequences are extracted.

In order to carry out the object segmentation, in most cases, a so-called scene reference image is generated, which represents the static or quasi-static scene background of the respective surveillance scene. The image differences between a current camera image and this scene reference image are then evaluated for the object segmentation. As a rule, the scene reference image is generated through the evaluation of video sequences that have been recorded over several minutes.

A prior art of this kind has been disclosed, for example, in the scientific article by K. Toyama, J. Krumm, B. Brumitt, B. Meyers: Wallflower: Principles and practice of Background Maintenance, ICCV 1999, Corfu, Greece.

SUMMARY OF THE INVENTION

The invention relates to an image-processing device, a surveillance system, a method, and a computer program, that are provided in accordance with the present invention.

In keeping with these objects and with others which will become apparent hereinafter, one feature of the present invention resides, briefly stated, in an image-processing device for carrying out an object segmentation, comprising means for executing the object segmentation through comparison of a camera image to a received reference image of a surveillance scene; a learning device for generating the scene reference image; said learning device being configured to generate the scene reference image through evaluation of a medium-term and/or long-term observation of the surveillance scene that occurs in the situation selected from the group consisting of occurring over a time period of longer than one day, occurring over a time period which includes several states of the reference scenes, and both.

Another feature of the present invention resides, briefly stated, in a surveillance system, comprising an image processing device for carrying out an object segmentation and including means for executing the object segmentation through comparison of a camera image to a received reference image of a surveillance scene, a learning device for generating the scene reference image, said learning device being configured to generate the scene reference image through evaluation of a medium-term and/or long-term observation of the surveillance scene that occurs in the situation selected from the group consisting of occurring over a time period of longer than one day, occurring over a time period which includes several states of the reference scenes, and both; a plurality of interfaces for connection to surveillance cameras; and an evaluation device that is configured to establish proximity relationship between said surveillance cameras through use of trajectory-based objects.

A further feature of the present invention resides, briefly stated, in a method for generating a scene reference image of a surveillance scene for an object segmentation in image processing, comprising the steps of generating a scene reference through an evaluation of a medium-term and/or long-term observation of the surveillance scene that occurs over a time period selected from the group consisting of a time period of longer than one day, over a time period which includes several states of the surveillance scene, and both.

Finally, still another feature of the present invention resides in computer program with programming code means for executing a method an image processing device for carrying out an object segmentation and including means for executing the object segmentation through comparison of a camera image to a received reference image of a surveillance scene, a learning device for generating the scene reference image, said learning device being configured to generate the scene reference image through evaluation of a medium-term and/or long-term observation of the surveillance scene that occurs in the situation selected from the group consisting of occurring over a time period of longer than one day, occurring over a time period which includes several states of the reference scenes, and both; a plurality of interfaces for connection to surveillance cameras; and an evaluation device that is configured to establish proximity relationship between said surveillance cameras through use of trajectory-based objects, means for executing the object segmentation through comparison of a camera image to a received reference image of a surveillance; a learning device for generating the scene reference image; said learning device being configured to generate the scene reference image through evaluation of a medium-term and/or long-term observation of the surveillance scene that occurs in the situation selected from the group consisting of occurring over a time period of longer than one day, occurring over a time period which includes several states of the reference scenes, and both, when the program is executed on a computer The proposed image-processing device permits a digital image processing and is in particular embodied on the programming and/or circuitry level to carry out an object segmentation; the object segmentation is executed through comparison of a camera image to a scene reference image of a surveillance scene.

The camera image is part of a video sequence that is or has been recorded by a surveillance camera aimed at a surveillance scene. The surveillance scene can be a street, an intersection, a room, a square in a city, for example, in a public building, in a school, in a university, or the like. Preferably, the surveillance camera is installed in a fixed position, i.e. is stationary. In addition, the term "surveillance scene" is preferably understood to mean the entire environment recorded by the surveillance camera.

The scene reference image models the static and/or quasi-static scene background and/or foreground. In order to generate the scene reference image, a learning device is provided that is embodied, for example, in the form of a calculating unit or computer. In the object segmentation, by means of a comparison—for example through the use of a differentiation—of a current camera image and the scene reference image, moving objects are separated out from the scene background.

According to the present invention, the learning device for generating the scene reference image is embodied through evaluation of a medium-term and/or long-term observation of the surveillance scene.

In this connection, the invention is based on the concept that the known video surveillance systems always take into consideration only very short windows of time and therefore do not make use of medium term or long-term observation. They therefore do not take advantage of the fact that a surveillance camera monitors the same scene for a long time and can therefore learn much about the scene. The invention thus permits the establishment of a long-term model of the surveillance scene; the learning of the long-term model preferably occurs on the basis of robust statistics and it is therefore possible to take advantage of the fact that a typical surveillance camera always monitors the same surveillance scene over a period of several years. The invention is not limited to a particular surveillance scene and can be used for both exteriors and interiors.

According to alternative a of the invention, the medium-term and/or long-term observation occurs over a time period of longer than one day, preferably longer than several days, e.g. 3 days, and in particular longer than a week.

According to alternative b of the invention, the medium-term and/or long-term observation occurs over a time period that includes several states of the surveillance scene.

In this case, allowance is made for the fact that the methods known from the prior art for object segmentation or generally for separating the moving objects from the background function properly as long as the process involves a simple scene background in which relevant surveillance objects always move between the surveillance camera and the scene background. In the case of a more complex surveillance scenario in which the monitored object, viewed from the surveillance camera, is sometimes obscured by static objects in the scene (for example columns, billboards, etc.), then the methods known from the prior art often run into problems. The same is true for frequently moving objects in the scene background (leaves in the wind, flickering monitors, curtains, water surfaces) and other interference sources that cause lasting interference in the known methods.

Other problems experienced with the known methods are caused by shadows on static and quasi-static objects. The expression "static and quasi-static objects" is understood to mean objects that are associated with the scene background. In particular, they also include shadows that are caused by objects in the scene background, for example houses or trees.

The knowledge that interfering objects such as those described above exist, particularly the shaded regions, can be used to stabilize the results of the object segmentation and therefore the results of a subsequent object tracking (for example through elimination of a shadow that moves along with the object) or to vary the sensitivity of the detection since the shaded regions have a lower contrast.

In a preferred modification of the invention, the learning device is designed to establish a scene model of the surveillance scene; the scene model forms the basis for the generation of the scene reference image. The scene model is preferably embodied as a model world that is in particular generated through the fusion of information from the static objects, interference regions, static and quasi-static shaded regions, and typical trajectories and/or entrances and exits. In other words, the scene model is implemented in the form of a backdrop image.

For example, the scene model includes static objects in the surveillance scene, e.g. a rotating advertising column that is situated so that a moving object may possibly move out of sight behind the static object for a period of time. In particular, the advantage of the scene model is that in an object tracking, the intermittently hidden moving object is not lost, but can be waited for until the moving object is once again visible in the surveillance scene. The recognition of static objects is used in particular to maintain an object identification of a tracked object, in particular even if it is completely obscured by a static object.

The recording of interference regions in the scene model (leaf movements, flickering monitors, curtains, water surfaces) permits an adapted handling of these regions so that the object segmentation is not encumbered with lasting interference due to foreground objects (moving objects) being detected in the interference regions. In addition, the knowledge of static or quasi-static shaded regions can be advantageously used in the object tracking and object segmentation so that these processes can be stabilized.

The learning device is embodied so that in a first step, the properties of the surveillance scene are learned; this step can easily extend even over a period of several weeks. After the initial learning of the scene model, the data obtained, i.e. the scene model, can also be used for the purpose of video surveillance, for example to detect abnormal behavior or to improve the object tracking. In particular, the learning device is designed to execute continuous refinement in order to adapt to new properties of the surveillance scene.

In a preferred embodiment of the invention, the scene model includes trajectory-based objects and/or image-based objects.

In particular, the trajectory-based objects are determined through the evaluation of the trajectories of moving objects. The trajectory-based objects are in particular embodied as paths, walkways, streets, entrances or exits, and/or static objects. The terms "entrances" and "exits" indicate the image regions in which the moving objects first appear in the surveillance scene or finally disappear from the surveillance scene. Static objects are in particular detected by virtue of the fact that the moving objects are intermittently hidden behind the static objects.

Image-based objects are preferably background objects that are detected independent of trajectory. The detection particularly occurs through evaluation of the chronological behavior of regions of interest or of the image-based objects. In particular, the image-based objects are embodied in the form of interference regions, reflective regions, and/or shaded regions.

In a modification of the invention, the scene model is embodied in the form of a multi-mode scene model; the individual modes of the multi-mode scene model can be distinguished by means of the different states of the surveillance scene. The use of the multi-mode scene model is hereby disclosed not only in connection with the preamble to claim 1 but also optionally with the other mentioned characteristics of claim 1, as well as the subsequent dependent claims in any combination. The different states of the surveillance scene are preferably embodied as regularly or periodically occurring states; the periodic spacing in time and the periodic duration of the states preferably last for at least several hours. In particular, the different states relate to a changing behavior pattern of the moving objects.

Thus, for example, a first state of the surveillance scene can be obtained through surveillance on a workday and a second state of the surveillance scene can be obtained through surveillance on the weekend. Each of these two states constitutes a separate mode of the multi-mode scene model. Other states can also relate to the behavior of the moving objects in the morning, in the afternoon, during the day, or during the night.

Other states of the surveillance scene are preferably generated by regularly or periodically repeating characteristics of image-based objects. For example, the different states are constituted by different lighting, in particular the position of the sun or artificial lighting, or different environmental conditions, in particular weather. It is also advantageously possible to make use of different states that are constituted by a mixed form of the above-mentioned states of the surveillance scene.

In addition, the states of the surveillance scene can alternatively or additionally differ with regard to one or more of the following parameters: time, date, relative position and/or orientation of a surveillance camera, absolute position and/or orientation of a surveillance camera, weather conditions, lighting conditions, day of the week, season, lunar phase, etc. Each of the above-mentioned different states of the surveillance scene can constitute an individual mode within the multi-mode scene model.

The advantage of a multi-mode scene model constructed in this way lies in the fact that the object segmentation and/or the object tracking can be significantly improved, in particular stabilized, since the comparison between a current camera image and the scene reference image is closer to reality and can therefore be carried out more precisely.

Another subject of the invention relates to a surveillance system that includes the above-described image-processing device and also a plurality of interfaces for connection to surveillance cameras. The interfaces here can be and/or are connected directly to the surveillance cameras. Alternatively, the surveillance system is connected to the surveillance camera via a wired and/or wireless network, in particular the Internet. It is also possible to connect storage devices for storing video data, in particular video recorders, between them.

The surveillance system according to the present invention is characterized by means of an evaluation device that is in particular embodied on the programming and/or circuitry level to establish proximity relationships between the surveillance cameras through the use of trajectory-based objects.

This additional aspect of the invention is based on the consideration that in surveillance systems with camera networks, it is necessary to determine the geographic situation or location of the cameras, particularly in relation to one another, and to input them into the surveillance system before it is possible to hand off the tracked surveillance objects between the individual surveillance cameras.

The proximity relationship between the surveillance cameras is preferably determined through evaluation of the entrances and/or exits that are learned by means of long-term and/or medium-term observation. For this reason, the invention brings the advantage that the entrances and/or exits make it possible to draw conclusions about the position of the surveillance camera in a camera network, thus permitting the tracked objects to be handed off to the next respective surveillance camera.

Another subject of the invention relates to a method for generating a scene reference image of a surveillance scene. In the method, which is embodied for an object segmentation in the image processing and is preferably executed through the use of an image-processing device and/or a surveillance system. In the method, the scene reference image is generated through an evaluation of the long-term and/or medium-term observation of the surveillance scene; the surveillance occurs over a time period longer than one day, preferably longer than several days, in particular longer than one week and/or over a time period that includes several states of the surveillance scene.

In particular, the method includes a first step in which for a multi-mode scene model, trajectory-based objects are optionally generated from the trajectories in addition to their classification. Preferably in a second step, the scene background is evaluated, i.e. ignoring and/or eliminating the moving objects, so that image-based objects are learned. In an additional step, the objects that are detected and learned in this way are combined to establish a scene model. In an additional step, additional data such as the time, date, compass reading, longitude, data from position sensors, etc. are optionally used in order to define different states of the surveillance scene and to establish a multi-mode scene model; each mode of the multi-mode scene model is associated with a state of the surveillance scene. In an additional step, current video sequences of the surveillance cameras are evaluated through the use of the multi-mode scene model and in this way, monitored objects are tracked in the current video sequences.

An improvement of the multi-mode scene model and/or of the object segmentation and/or of the object tracking is optionally achieved in that camera images from different states and scenes of different modes of the multi-mode scene model are compared to one another. For example, it is possible to detect data regions in which camera images of a surveillance scene with and without shadows, i.e. at different times of day, for example, are compared to one another.

Another subject of the present invention relates to a computer program with programming code means for executing the inventive method, when the program is executed on a computer and/or on the inventive device.

Other features, advantages, or effects of the present invention ensue from the following description as well as the associated drawings of a preferred exemplary embodiment.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
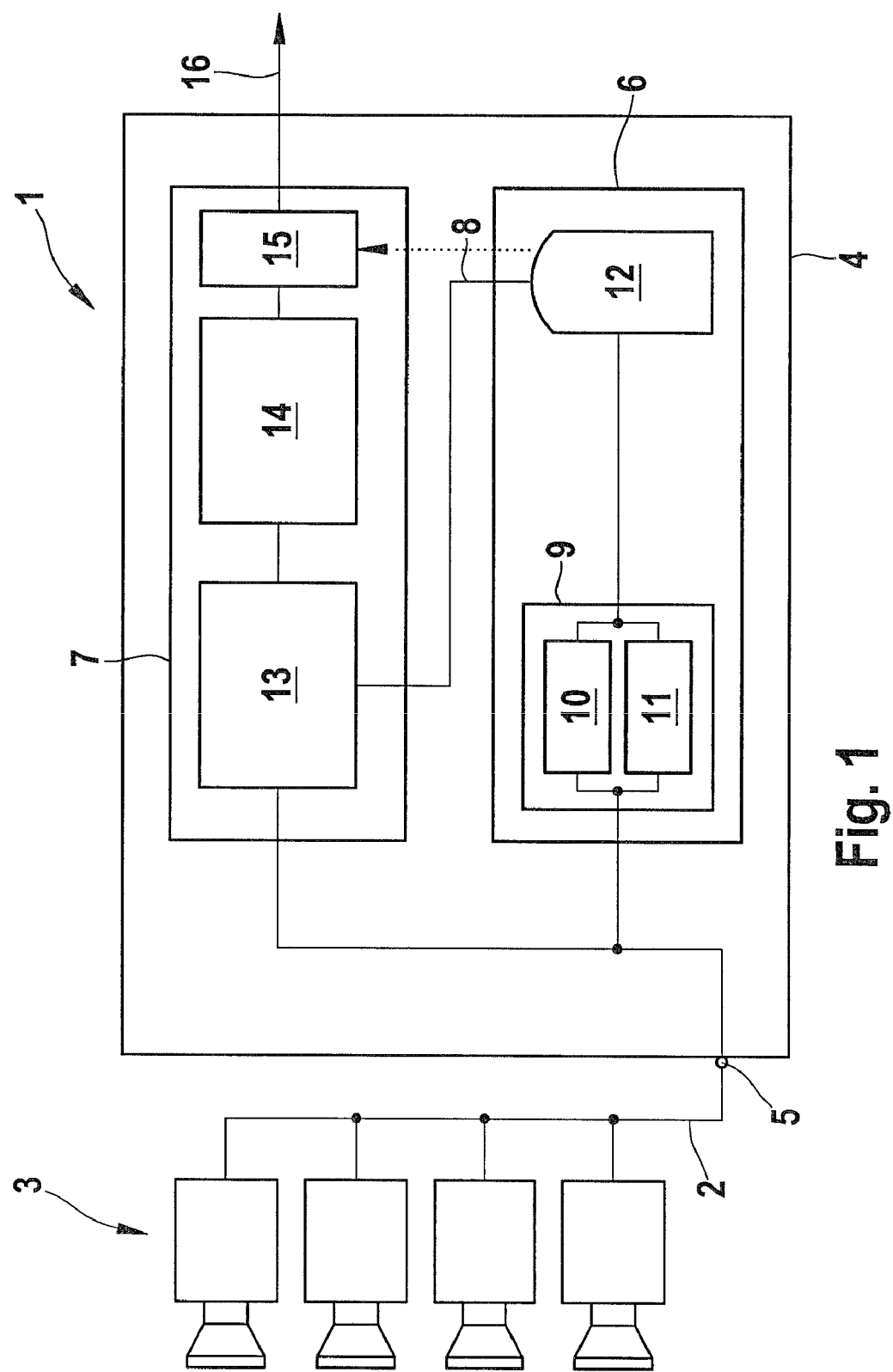
FIG. 1 is a schematic block circuit diagram of an exemplary embodiment of a surveillance system according to the invention, which includes an exemplary embodiment of an image-processing device according to the invention.

FIG. 1 is a schematic block circuit diagram of a surveillance system 1, which is connected via a network 2 to a plurality of surveillance cameras 3. For example, the surveillance cameras 3 are fixed-mounted surveillance cameras of a known design. The network 2 is embodied in a wired or wireless form; transmission can also occur via the Internet. Video data streams or video sequences of the surveillance camera 3 are conveyed via the network 2 to an image-processing device 4. Optionally, the network 2 is also provided with video recorders for intermediate storage of the video data streams. After transmission of the video data streams of the surveillance camera 3 via an interface 5, the video data stream is divided and on the one hand, travels to a learning device 6 and on the other hand, travels to an analysis module 7.

The learning device 6 serves to generate a scene reference image, which is transmitted from the learning device 6 to the analysis module 7 via a connecting line 8. In order to generate the scene reference image, the video data streams are examined in an image-evaluation module 9 that is part of the learning device 6. Thus trajectory-based objects are extracted in a first block 10 and parallel to this, image-based objects are extracted in a second block 11.

The extraction of the trajectory-based objects, for example paths, walkways, streets, entrances, exits, and static objects, executed in block 10 is essentially based on extracted metadata about the surveillance scene, in particular on the trajectories of the moving objects and their classification. Through evaluation of a sufficiently large number of trajectories (ideally more than a thousand), it is possible to draw a statistically robust conclusion about frequently traveled paths. Optionally, in the learning of typical paths (trajectories) in the surveillance scene, for example the time, in particular the time of day or the day of the week, is taken into account for a classification.

From the trajectories, for example, it is possible to read the positions in the surveillance image in which static objects are situated in the scene since in these regions, the trajectories are interrupted and there is thus an indication of a static obstruction. Possible entrances and exits can likewise be extracted from this database in that the beginning and end of each trajectory are detected and these data are clustered. In one optional embodiment of the invention, the entrances and exits can be used to gain information about the position of the surveillance cameras 3 in a camera network and the tracked objects are handed off to the adjacent respective surveillance camera 3.

The extraction of the image-based objects, for example interference regions (leaf movements, flickering monitors, curtains, water surfaces, etc.), reflective regions (curved surfaces, windowpanes, or vehicle windows), or static shaded regions is executed in the second block 11 through an evaluation of the video data streams and in particular without considering the trajectories of the moving objects. In particular, a static evaluation of the chronological signal changes in different regions of the image occurs as well as the subsequent classification of the corresponding regions. For example, interference regions are characterized by high-level noise; this noise is also usually periodic and is therefore detectable.

The reflective regions are likewise characterized by noise. As opposed to the interference regions, however, in the reflective regions, the luminescence increases sharply and the region is very bright, e.g. when the sun is shining directly onto a window. The static shaded regions characterize the lighting of the surveillance scene at different times. This information is obtained through the evaluation of the surveillance scene over individual days and is optionally supplemented with the data from a compass as well as the longitude and latitude of the camera location. A comparison of a camera recording with a recording of the same scene without shadows (for example at 12 noon) can be used to detect the static shaded regions.

It should be emphasized here that the proposed methods for obtaining the necessary data and the extraction of the objects are only given by way of example. Other methods that can be used to carry out the object extraction can be found, for example, in the following scientific articles: D. Makris, T. Ellis: Learning semantic scene models from observing activity in visual surveillance; IEEE 2005 or D. Makris, T. Ellis, J. Black: Bridging the gaps between cameras; Kingston University 2005, or R. Bowden, P. KaewTraKulPong: Towards automated wide area visual surveillance: tracking objects between spatially-separated uncalibrated views; IEEE 2005, whose disclosures are hereby fully incorporated into the present specification by reference.

The data about the extracted objects are transmitted via a data line to a data memory 12 that administers a multi-mode scene model. For each state of the surveillance scene, this multi-mode scene model has a separate model, particularly in the sense of a model world or backdrop world. In particular, the multi-mode scene model is embodied in the form of a virtual world. The different modes of the multi-mode scene model here relate to different states of the surveillance scene; the states can differ due to the movement pattern of moving objects and/or to environmental conditions of the surveillance scene.

As required by the analysis module 7, a relevant scene reference image is transmitted from the image-processing device 4 or the data memory 12 to the analysis module 7 via the connecting line 8. A relevant scene reference image here is characterized in that it is constituted by a mode of the multi-mode scene model, which mode corresponds to the state of the surveillance scene that is represented by the video data stream currently to be analyzed in the analysis module 7.

In the analysis module 7, the transmitted scene reference image is compared in a known fashion to the individual camera images of the video data streams and an object segmentation is carried out in a module for object segmentation 13. The results of the object segmentation are sent to a module for object tracking 14, which carries out an object tracking, also in a known fashion. The tracked objects are then analyzed in an evaluation module 15. This can also optionally occur through the use of data from the data memory 12 in that a check is run, for example, as to whether or not a certain movement pattern is normal for a certain state of the surveillance scene or a certain mode of the multi-mode scene model. Thus, for example, the movement in a surveillance scene that is normal for a workday is conversely abnormal on the weekend. The results generated in the analysis module 7, together with the video data streams, are output as metadata via an output 16 for further routing, evaluation, and utilization.

Figure 2:
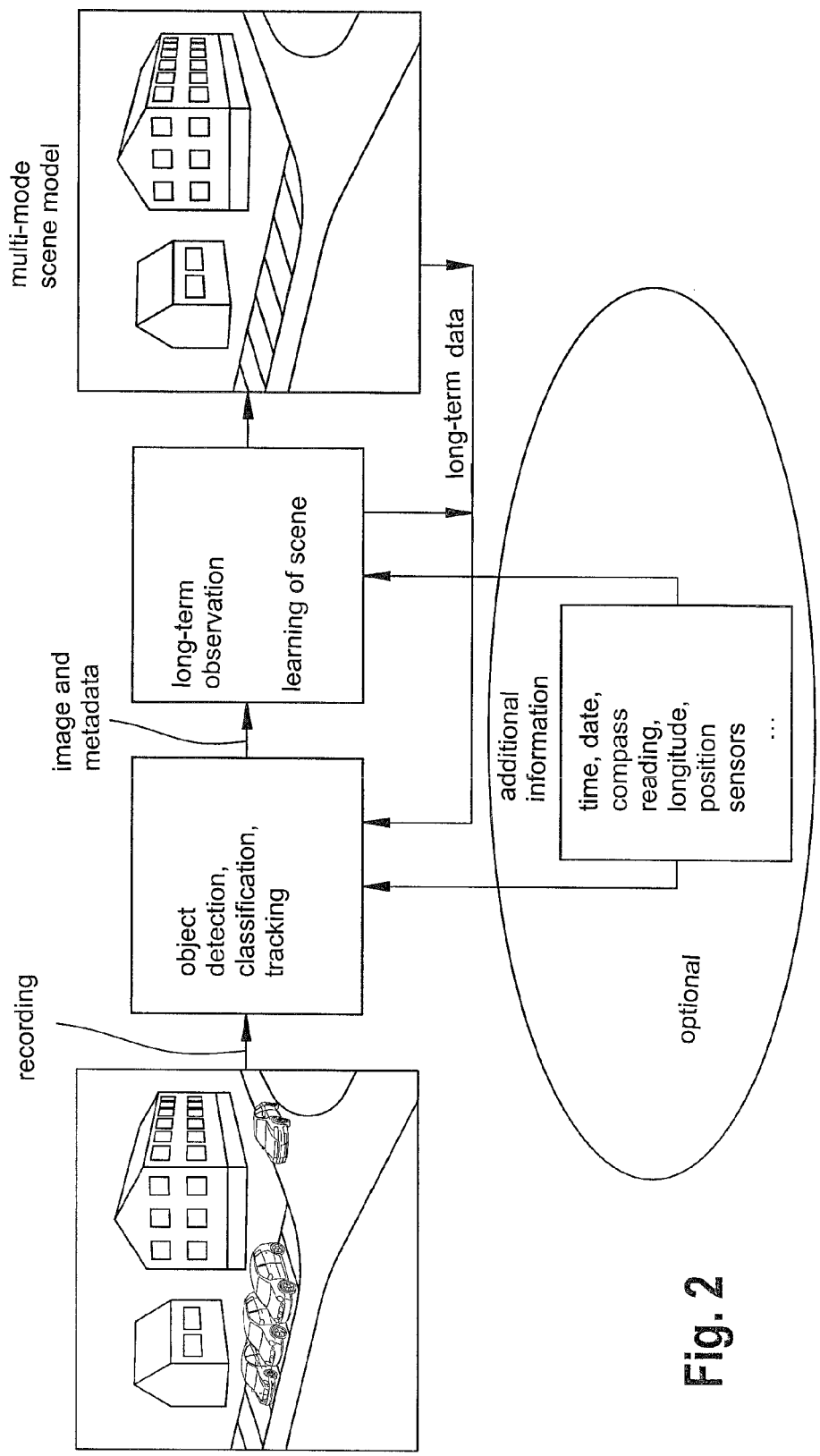
FIG. 2 is a schematic depiction of the method according to the invention, in particular for use of the image-processing device shown in FIG. 1 and of the surveillance system.

FIG. 2 is a schematic representation of the progression of an exemplary embodiment of the method according to the invention, in particular through the use of the surveillance system 1 in FIG. 1.

In a first step, surveillance cameras 3 make recordings of relevant surveillance regions. In a second step, the video data streams thus generated are evaluated through an object detection, a classification of the detected objects, and an object tracking. The results achieved in this step are compiled as images and metadata in a third step and evaluated over the course of a long-term observation that continues for more than one day. In this step, the characteristics of the surveillance scene are learned and combined into a multi-mode scene model. The multi-mode scene model thus constitutes a long-term model that can require several weeks of learning time. The method is preferably based not exclusively on the video data streams, but optionally on other additional data such as the time and date or the longitude and latitude of the location of the surveillance camera.

All of the information in the long-term model is combined in order to obtain the multi-mode long-term model. Preferably the learning of the long-term model occurs in a fully automated fashion. The segmenting and/or tracking algorithms used in the surveillance are stabilized through the use of the long-term module and the multi-mode scene model. It is also possible, through the use of the multi-mode scene model, to detect abnormal behavior of surveillance objects.

It will be understood that each of the elements described above, or two or more together, may also find a useful application in other types of constructions and methods differing from the type described above.

While the invention has been illustrated and described as embodied in an image-processing device, surveillance system, method for establishing a scene reference image, and computer program, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An image-processing device for carrying out an object segmentation, comprising:
    means for executing the object segmentation through comparison of a camera image to a received reference image of a surveillance scene;
    a learning device for generating the scene reference image, said learning device being configured to generate the scene reference image through evaluation of a medium-term and/or long-term observation of the surveillance scene that occurs in a situation selected from the group consisting of occurring over a time period of longer than one day, occurring over a time period which includes several states of the reference scene, and both,
    wherein said learning device is configured to generate a scene model, wherein the scene model is a model of a scene that comprises artificial model objects in the form of a virtual world, and wherein said scene model is in the form of a multi-mode scene model and individual modes of said multi-mode scene model are distinguished through different states of the surveillance scene, and wherein the states of the surveillance scene differ with regard to one or more of parameters selected from the group consisting of relative position of a surveillance camera, relative orientation of a surveillance camera, absolute position of a surveillance camera, and absolute orientation of the surveillance camera, wherein the scene model forms the basis for the generation of the scene reference image.

2. The image-processing device as defined in claim 1, wherein said learning device is configured so as to generate the scene reference image through the evaluation of a medium-term and/or long-term observation of the surveillance scene that occurs longer than several days.

3. The image-processing device as defined in claim 1, wherein said learning device is configured so as to generate the scene reference image through the evaluation of a medium-term and/or long-term observation of the surveillance scene that occurs longer than one week.

4. The image-processing device as defined in claim 1, wherein said learning device is configured to generate the scene model of the surveillance scene.

5. The image-processing device as defined in claim 4, wherein said learning device is configured so that it generates the scene model including objects selected from the group consisting of trajectory-based objects, image-based objects, and both.

6. The image-processing device as defined in claim 5, wherein said learning device is configured so as to generate the scene model including the trajectory-based objects selected from the group consisting of paths, walkways, streets, entrances, exits, static objects, and combinations thereof.

7. The image-processing device as defined in claim 5, wherein said learning device is configured so as to generate the scene model including the image-based objects selected from the group consisting of interference regions, reflective regions, shaded regions, and combinations thereof.

8. The image-processing device as defined in claim 1, wherein the states of the surveillance scene differ with regard to another one or more of parameters selected further from the group consisting of hour, time of day, date, day of the week, season, and lunar phase.

9. A surveillance system, comprising:
    an image processing device for carrying out an object segmentation and including means for executing the object segmentation through comparison of a camera image to a received reference image of a surveillance scene;
    a learning device for generating the scene reference image, said learning device being configured to generate the scene reference image through evaluation of a medium-term and/or long-term observation of the surveillance scene that occurs in a situation selected from the group consisting of occurring over a time period of longer than one day, occurring over a time period which includes several states of the reference scene, and both, wherein said learning device is configured to generate a scene model, wherein the scene model is a model of a scene that comprises artificial model objects in the form of a virtual world, and wherein said scene model is in the form of a multi-mode scene model and individual modes of said multi-mode scene model are distinguished through different states of the surveillance scene, and wherein the states of the surveillance scene differ with regard to one or more of parameters selected from the group consisting of relative position of a surveillance camera, relative orientation of a surveillance camera, absolute position of a surveillance camera, and absolute orientation of the surveillance camera, wherein the scene model forms the basis for the generation of the scene reference image;

a plurality of interfaces for connection to surveillance cameras; and an evaluation device that is configured to establish proximity relationship between said surveillance cameras through use of trajectory-based objects.

10. The surveillance system as defined in claim 9, wherein the trajectory-based objects are implemented in form selected from the group consisting of entrances, exits, and both.

11. A method for generating a scene reference image of a surveillance scene for an object segmentation in image processing, comprising the steps of:

providing a learning device for generating the scene reference image;

generating a scene reference image with said learning device by evaluating a medium-term and/or long-term observation of the surveillance scene that occurs over a time period selected from the group consisting of a time period of longer than one day, over a time period which includes several states of the surveillance scene, and both, wherein said learning device is configured to generate a scene model, wherein the scene model is a model of a scene that comprises artificial model objects in the form of a virtual world, and wherein said scene model is in the form of a multi-mode scene model and individual modes of said multi-mode scene model are distinguished through different states of the surveillance scene, and wherein the states of the surveillance scene differ with regard to one or more of parameters selected from the group consisting of relative position of a surveillance camera, relative orientation of a surveillance camera, absolute position of a surveillance camera, and absolute orientation of the surveillance camera, wherein the scene model forms the basis for the generation of the scene reference image.

12. The method as defined in claim 11, wherein said generating of the scene reference image includes generating the scene reference image over a time period longer than several days.

13. The method as defined in claim 11, wherein said generating of the scene reference image includes generating the scene reference image over a time period longer than one week.

14. A non-transitory computer readable medium containing a computer program with programming code means for executing a method on an image processing device for carrying out an object segmentation, said image processing device including means for executing the object segmentation through comparison of a camera image to a received reference image of a surveillance scene, a learning device for generating the scene reference image, said learning device being configured to generate the scene reference image through evaluation of a medium-term and/or long-term observation of the surveillance scene that occurs in a situation selected from the group consisting of occurring over a time period of longer than one day, occurring over a time period which includes several states of the reference scene, and both when the program is executed on a computer, wherein said learning device is configured to generate a scene model wherein the scene model is a model of a scene that comprises artificial model objects in the form of a virtual world, and wherein said scene model is in the form of a multi-mode scene model and individual modes of said multi-mode scene model are distinguished through different states of the surveillance scene, and wherein the states of the surveillance scene differ with regard to one or more of parameters selected from the group consisting of relative position of a surveillance camera, relative orientation of a surveillance camera, absolute position of a surveillance camera, and absolute orientation of the surveillance camera, wherein the scene model forms the basis for the generation of the scene reference image;

a plurality of interfaces for connection to surveillance cameras; and an evaluation device that is configured to establish proximity relationship between said surveillance cameras through use of trajectory-based objects.

* * * * *